US010798013B2

(12) United States Patent
Chung et al.

(10) Patent No.: US 10,798,013 B2
(45) Date of Patent: Oct. 6, 2020

(54) METHOD OF DATA CACHING IN DELAY TOLERANT NETWORK BASED ON INFORMATION CENTRIC NETWORK, COMPUTER READABLE MEDIUM AND DEVICE FOR PERFORMING THE METHOD

(71) Applicant: Foundation of Soongsil University-Industry Cooperation, Seoul (KR)

(72) Inventors: Yun Won Chung, Seoul (KR); Min Wook Kang, Namyangju-si (KR)

(73) Assignee: Foundation of Soongsil University-Industry Cooperation, Seoul (KR)

(*) Notice: Subject to any disclaimer, the term of this patent is extended or adjusted under 35 U.S.C. 154(b) by 35 days.

(21) Appl. No.: 16/177,008

(22) Filed: Oct. 31, 2018

(65) Prior Publication Data

US 2020/0053015 A1   Feb. 13, 2020

(30) Foreign Application Priority Data

Aug. 9, 2018  (KR) .................. 10-2018-0092875
Aug. 29, 2018 (KR) .................. 10-2018-0102170

(51) Int. Cl.
*H04L 12/835* (2013.01)
*H04L 12/841* (2013.01)
(Continued)

(52) U.S. Cl.
CPC ............ *H04L 47/30* (2013.01); *H04L 45/306* (2013.01); *H04L 45/742* (2013.01);
(Continued)

(58) Field of Classification Search
CPC ... H04L 47/30; H04L 47/2433; H04L 47/283; H04L 47/6275; H04L 47/25; H04L 47/286; H04L 45/742; H04L 45/306
See application file for complete search history.

(56) References Cited

U.S. PATENT DOCUMENTS 8,694,675 B2   4/2014 Wang et al.
9,756,112 B2 *  9/2017 Jana .................. H04L 47/25
(Continued)

FOREIGN PATENT DOCUMENTS

EP       2849410 A4 *  5/2015  ............. G06F 13/26
EP       3206348 A1 *  8/2017  ............ H04L 45/306
(Continued)

OTHER PUBLICATIONS

Arabi et al., Information-Centric Networking Meets Delay Tolerant Networking: Beyond Edge Caching, 2018 IEEE Wireless Communications and Networking Conference (WCNC) (Year: 2018).*
(Continued)

*Primary Examiner* — Kostas J Katsikis
(74) *Attorney, Agent, or Firm* — Novick, Kim & Lee, PLLC; Sang Ho Lee (57) ABSTRACT

Provided is a method of data caching in delay tolerant network based on information centric network and a recording medium and a device for performing the same. The data caching method includes: the step of checking a remaining buffer amount and a buffer usage amount of node, the step of caching data in the node which is received from another node according to a data caching policy, in case remaining buffer amount of the node is greater than a preset remaining buffer amount threshold, the step of deleting data cached in the node from the node according to a data deletion policy, in case the buffer usage amount of the node is less than a preset buffer usage amount threshold, and the step of setting an initial Time-to-Live (TTL) value of the data received
(Continued)

from another node or updating a TTL of the data cached in the node using information of the data received from another node or information of the node.

11 Claims, 5 Drawing Sheets

(51) Int. Cl.
    *H04L 12/747*     (2013.01)
    *H04L 12/725*     (2013.01)
    *H04L 12/851*     (2013.01)
    *H04L 12/865*     (2013.01)
    *H04L 12/825*     (2013.01)

(52) U.S. Cl.
    CPC .......... *H04L 47/2433* (2013.01); *H04L 47/25* (2013.01); *H04L 47/283* (2013.01); *H04L 47/286* (2013.01); *H04L 47/6275* (2013.01)

(56) References Cited

U.S. PATENT DOCUMENTS

| | | | | |
|---|---|---|---|---|
| 10,397,123 | B2* | 8/2019 | Jana | H04L 47/30 |
| 10,555,205 | B2* | 2/2020 | Cai | H04W 24/08 |
| 10,609,108 | B2* | 3/2020 | Sintorn | H04L 65/602 |
| 2007/0206615 | A1* | 9/2007 | Plamondon | H04L 1/1887 |
| | | | | 370/401 |
| 2008/0222352 | A1* | 9/2008 | Booth | H04L 45/7453 |
| | | | | 711/108 |
| 2008/0225728 | A1* | 9/2008 | Plamondon | H04L 47/10 |
| | | | | 370/237 |
| 2009/0094359 | A1* | 4/2009 | McDonnell | H04L 47/27 |
| | | | | 709/224 |
| 2010/0121972 | A1* | 5/2010 | Samuels | H04L 41/082 |
| | | | | 709/231 |
| 2010/0268881 | A1* | 10/2010 | Galchev | G06F 12/084 |
| | | | | 711/121 |
| 2012/0042060 | A1* | 2/2012 | Jackowski | H04L 67/42 |
| | | | | 709/224 |
| 2012/0078994 | A1* | 3/2012 | Jackowski | H04L 65/80 |
| | | | | 709/202 |
| 2013/0077486 | A1* | 3/2013 | Keith | H04L 47/2433 |
| | | | | 370/230.1 |
| 2013/0219081 | A1* | 8/2013 | Qian | H04L 67/327 |
| | | | | 709/241 |
| 2014/0078918 | A1* | 3/2014 | Han | H04L 12/12 |
| | | | | 370/252 |
| 2015/0281083 | A1* | 10/2015 | Kim | H04L 45/7457 |
| | | | | 370/235 |
| 2015/0372910 | A1* | 12/2015 | Janakiraman | H04L 45/7453 |
| | | | | 370/392 |
| 2015/0372933 | A1* | 12/2015 | Cai | H04W 72/085 |
| | | | | 370/329 |
| 2016/0043963 | A1* | 2/2016 | Oran | H04L 47/722 |
| | | | | 370/231 |
| 2016/0156737 | A1* | 6/2016 | Perino | H04L 67/2842 |
| | | | | 709/238 |
| 2016/0182353 | A1* | 6/2016 | Garcia-Luna-Aceves | |
| | | | | H04L 45/306 |
| | | | | 709/241 |
| 2016/0234078 | A1* | 8/2016 | Jana | H04L 67/02 |
| 2016/0255009 | A1* | 9/2016 | Ramaiah | H04L 47/27 |
| | | | | 370/235 |
| 2016/0255535 | A1* | 9/2016 | De Foy | H04L 67/2804 |
| | | | | 370/236 |
| 2016/0295448 | A1* | 10/2016 | Cai | H04W 72/12 |
| 2016/0373361 | A1* | 12/2016 | Dhanabalan | H04L 47/24 |
| 2017/0054659 | A1* | 2/2017 | Ergin | H04L 67/1097 |
| 2017/0214625 | A1* | 7/2017 | Dhanabalan | H04L 47/12 |
| 2017/0237657 | A1* | 8/2017 | Rath | H04L 45/306 |
| | | | | 709/238 |
| 2017/0331752 | A1* | 11/2017 | Jana | H04L 67/02 |
| 2018/0020390 | A1* | 1/2018 | Park | H04B 7/15528 |
| 2018/0091615 | A1* | 3/2018 | Seedorf | H04L 9/3247 |
| 2018/0295039 | A1* | 10/2018 | Yasman | H04L 49/9021 |
| 2018/0335968 | A1* | 11/2018 | Pauley | G06F 3/068 |
| 2019/0073419 | A1* | 3/2019 | Dong | H04L 67/327 |
| 2019/0334824 | A1* | 10/2019 | Jana | H04L 47/30 |
| 2019/0349445 | A1* | 11/2019 | Somayazulu | H04L 41/5035 |

FOREIGN PATENT DOCUMENTS

| | | | |
|---|---|---|---|
| KR | 10-2008-0104288 A | 12/2008 | |
| KR | 10-2013-0064906 A | 6/2013 | |
| KR | 10-2014-0054886 A | 5/2014 | |
| WO | WO-2016150502 A1 * | 9/2016 | ......... H04L 67/2842 |

OTHER PUBLICATIONS

Henriksson et al., A Caching-Based Approach to Routing in Delay-Tolerant Networks, 2007 16th International Conference on Computer Communications and Networks, Honolulu, HI, 2007, pp. 69-74, doi: 10.1109/ICCCN.2007.4317799. (Year: 2007).*

Jun-She Wang et al., "Cache Management Based on Node Status in Delay Tolerant Networks", Advances in Computer Science Research, vol. 44, 3rd International Conference on Wireless Communication and Sensor Network (WCSN 2016), pp. 470-474.

Tomoaki Miyakawa et al., "A Hybrid Type DTN Routing Method Using Delivery Predictability and Maximum Number of Replication", 2015 29th International Conference on Advanced Information Networking and Applications Workshops, IEEE, pp. 451-456.

Dileep Mardham et al., "Opportunistic Distributed Caching for Missionoriented Delay-tolerant Networks", 2018 14th Annual Conference on Wireless On-demand Network Systems and Services (WONS), IEEE (Mar. 12, 2018), pp. 17-24.

Lindgren et al., RFC 6693. "Probabilistic Routing Protocol for Intermittently Connected Networks, Lulea University of Technology (Aug. 2012)".

Prior Disclosure by Inventor(s): Yun Won Chung et al. "Extension of Probabilistic Routing Protocol using History Encounters and Transitivity for Information Centric Network". Jul. 2, 2018, 15pages, 2018 Internet Engineering Task Force (IETF) Trust.

* cited by examiner

METHOD OF DATA CACHING IN DELAY
TOLERANT NETWORK BASED ON
INFORMATION CENTRIC NETWORK,
COMPUTER READABLE MEDIUM AND
DEVICE FOR PERFORMING THE METHOD

CROSS-REFERENCE TO RELATED
APPLICATIONS

This application claims priority under 35 U.S.C. § 119 to Korean Patent Application No. 10-2018-0092875, filed on Aug. 9, 2018, and Korean Patent Application No. 10-2018-0102170, filed on Aug. 29, 2018 in the Korean Intellectual Property Office, the disclosures of which are incorporated herein by reference in their entirety.

TECHNICAL FIELD

The present disclosure relates to a method of data caching in delay tolerant network based on information centric network and a recording medium and a device for performing the same, and more particularly, to a data caching method that can be applied to the delay tolerant network environment having limited buffer capacity and a recording medium and a device for performing the same.

BACKGROUND

Delay Tolerant Networking (DTN) is an approach designed to deliver a message between neighboring nodes in a store-carry-forward way in an environment where connectivity between a source node and a destination node is not guaranteed. In DTN, each node stores a message to transmit, and can forward the message to other nodes according to a preset condition when it encounters another node.

DTN attracts a lot of attention because it can overcome disconnection through opportunistic transmission between encountered neighboring nodes in an extreme environment where the communication infrastructure is destroyed by a disaster, such as earthquakes, floods and fires, and there is no stable routing path to connect many nodes due to low node density.

Meanwhile, the Information Centric Networking (ICN) is a communication approach based on a data name rather than an IP address. Currently, there are rapid increases in Internet usage in terms of the number of users and data capacity. According to the current IP address-based data transmission method, transmission is carried out using a receiver's IP address related to the physical location, and accordingly the same data is repeatedly transmitted through the network. Therefore, the current data transmission method is inefficient.

ICN is technology proposed to overcome a traffic bottleneck phenomenon which is a disadvantage of the conventional IP address-based communication method, and the ICN enables routers or nodes to store and distribute specified data to neighboring routers or nodes that request the corresponding data. In ICN, a message may be classified either into Interest and Data. A consumer or data requester that needs Data can disseminate Interest through the network. When receiving the Interest, a router, node or data provider that has the requested Data may deliver the Data to the consumer or data requester back through the same path from which the Interest delivered.

ICN is designed based on a network environment where connectivity is guaranteed, and enforces a caching policy based on various network information collected in the network environment.

However, because DTN where connectivity between nodes is not guaranteed has limited buffer capacity, when ICN is applied to DTN, it is impossible to apply the conventional caching policy as it is.

Additionally, multiple nodes may request the same data in ICN, and in view of this, there is a need for a new caching policy.

SUMMARY

An aspect of the present disclosure provides a data caching method for controlling data caching or deletion according to a data caching or deletion policy using data information or node information defined in an information centric network in consideration of node buffer capacity, and a recording medium and a device for performing the same.

To achieve the above-described object, a data caching method of the present disclosure includes: checking whether data is received from a first node; checking a remaining buffer amount and a buffer usage amount of a second node; caching the data received from the first node in the second node according to a data caching policy, when the data is received from the first node and the remaining buffer amount of the second node is greater than a preset remaining buffer amount threshold; deleting data cached in the second node from the second node according to a data deletion policy, when the data is not received from the first node and the buffer usage amount of the second node is less than a preset buffer usage amount threshold; and setting an initial Time-to-Live (TTL) value of the data received from the first node or updating a TTL of the data cached in the second node using information of the data received from the first node or information of the second node In this method, the caching of the data may include: comparing data information including the number of requester nodes of the data received from the first node or node information including delivery predictability of the data received from the first node to a requester node with a preset data caching threshold; and setting a remaining delivery frequency of the data received from the first node according to a result of the comparison between the data information or the node information and the preset data caching threshold, and caching the data received from the first node in the second node.

The setting of the initial TTL value may include: setting the initial TTL value of the data received from the first node using the data information including the number of requester nodes and a priority of the data received from the first node, or the node information including the delivery predictability of the data received from the first node to the requester node.

The updating of the TTL may include: calculating a variation of the data information including the number of requester nodes and a remaining delivery frequency of the data cached in the second node, or delivery predictability of the data cached in the second node to the requester node for a unit time; calculating a TTL increase and decrease value of the data cached in the second node using the variation per the unit time; and updating the TTL of the data cached in the second node by adding the TTL increase and decrease value to a current TTL of the data cached in the second node.

The updating of the TTL may include: checking the TTL of the data cached in the second node; and when the TTL of the data cached in the second node is equal to or less than zero (0), deleting the data cached in the second node from the second node.

The setting of the remaining delivery frequency of the data may include: when the data information or the node information is less than the preset data caching threshold, setting the remaining delivery frequency of the data received from the first node to one (1), and caching the data received from the first node in the second node; and when the data information or the node information is equal to or greater than the preset data caching threshold, calculating the remaining delivery frequency of the data received from the first node using the data information or the node information.

The setting of the remaining delivery frequency of the data may include: checking the remaining delivery frequency of the data cached in the second node; and when the remaining delivery frequency of the data cached in the second node is zero (0), deleting the data cached in the second node.

The deleting of the data may include: arranging at least one sub-data in the data cached in the second node based on the data information including the number of requester nodes, the TTL, a remaining delivery frequency and a priority of the data cached in the second node; and deleting the data cached in the second node according to an order of the arrangement of the at least one sub-data in the data cached in the second node.

The deleting of the data may include: calculating a data information arrangement value representing a relationship between the data information including the number of requester nodes, the TTL, a remaining delivery frequency and a priority of the data cached in the second node; arranging at least one sub-data in the data cached in the second node based on the data information arrangement value; and deleting the data cached in the second node according to an order of the arrangement of the at least one sub-data in the data cached in the second node.

The deleting of the data may include: arranging at least one sub-data in the data cached in the second node based on delivery predictability of the data cached in the second node to the requester node, or calculating a node information arrangement value representing a relationship between delivery predictability of the data cached in the second node to a requester node and a priority of the data cached in the second node, and arranging at least one sub-data in the data cached in the second node based on the node information arrangement value; and deleting the data cached in the second node according to an order of the arrangement of the at least one sub-data in the data cached in the second node.

In addition, there is provided a computer-readable non-transitory recording medium having recorded thereon a computer program for performing a method of data caching, the method comprising: checking whether data is received from a first node; checking a remaining buffer amount and a buffer usage amount of a second node; caching the data received from the first node in the second node according to a data caching policy, when the data is received from the first node and the remaining buffer amount of the second node is greater than a preset remaining buffer amount threshold; deleting data cached in the second node from the second node according to a data deletion policy, when the data is not received from the first node and the buffer usage amount of the second node is less than a preset buffer usage amount threshold; and setting an initial Time-to-Live (TTL) value of the data received from the first node or updating a TTL of the data cached in the second node using information of the data received from the first node or information of the second node In this recording method, the caching of the data may include: comparing data information including the number of requester nodes of the data received from the first node or node information including delivery predictability of the data received from the first node to a requester node with a preset data caching threshold; and setting a remaining delivery frequency of the data received from the first node according to a result of the comparison between the data information or the node information and the preset data caching threshold, and caching the data received from the first node in the second node.

In addition, there is provided a device for data caching in a delay tolerant network based on an information centric network, the device comprising: a memory; and one or more processors configured to: check whether data is received from a first node; check a remaining buffer amount and a buffer usage amount of a second node; cache the data received from the first node in the second node according to a data caching policy, when the data is received from the first node and the remaining buffer amount of the second node is greater than a preset remaining buffer amount threshold; delete data cached in the second node from the second node according to a data deletion policy, when the data is not received from the first node and the buffer usage amount of the second node is less than a preset buffer usage amount threshold; and set an initial Time-to-Live (TTL) value of the data received from the first node or updating a TTL of the data cached in the second node using information of the data received from the first node or information of the second node In this device, the caching of the data may include: comparing data information including the number of requester nodes of the data received from the first node or node information including delivery predictability of the data received from the first node to a requester node with a preset data caching threshold; and setting a remaining delivery frequency of the data received from the first node according to a result of the comparison between the data information or the node information and the preset data caching threshold, and caching the data received from the first node in the second node.

According to the present disclosure, it is possible to allow for an efficient node buffer capacity management in a delay tolerant network having limited node buffer capacity, and provide a caching service in consideration of the presence of multiple requester nodes for the same data in a delay tolerant network environment.

DETAILED DESCRIPTION OF EMBODIMENTS

The following detailed description of the present disclosure is made with reference to the accompanying drawings, in which particular embodiments for practicing the present disclosure are shown for illustration purposes. These embodiments are described in sufficient detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made for locations or arrangements of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects Hereinafter, the embodiments of the present disclosure will be described in more detail with reference to the accompanying drawings.

The term "Unit" is defined herein as having its broadest definition to an ordinary skill in the art to refer to a software including instructions executable in a non-transitory computer readable medium that would perform the associated function when executed, a circuit designed to perform the associated function, a hardware designed to perform the associated function, or a combination of a software, a circuit, or a hardware designed to perform the associated function.

Figure 1:
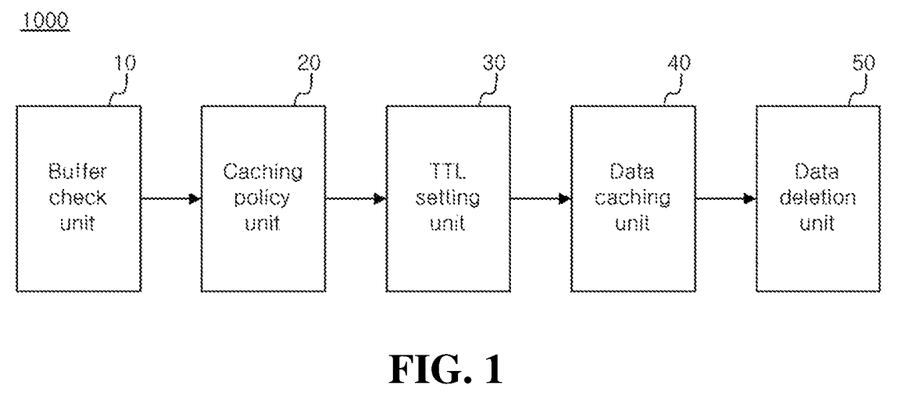
FIG. 1 is a block diagram of a device of data caching in a delay tolerant network based on information centric network according to an embodiment of the present disclosure.

FIG. 1 is a block diagram of a device of data caching in a delay tolerant network based on the information centric network according to the embodiment of the present disclosure.

The data caching device 1000 according to the embodiment of the present disclosure may be equipped in each node in a network environment to control caching of data received from another node or deletion of data cached in nodes.

In the present disclosure, the network environment may be a Delay Tolerant Networking (DTN) environment based on Information Centric Networking (ICN).

ICN is a networking approach based on data information such as the name of content or data rather than an IP address. In ICN, a message may be classified into Interest and Data. A data requester that needs Data can disseminate Interest through the network, and when receiving the Interest, a data provider that has the corresponding Data can deliver the Data to the data requester along the same path in reverse.

DTN is an approach designed to deliver a message between neighboring nodes in a store-carry-forward way in an environment where connectivity between a source node and a destination node is not guaranteed. In DTN, each node stores a message to transmit, and can forward the message to another node according to a preset condition when it encounters another node.

The data caching device 1000 according to the embodiment of the present disclosure may control data caching or deletion according to a data caching or deletion policy using data information or node information defined in ICN in consideration of node buffer capacity.

Referring to FIG. 1, the data caching device 1000 according to the embodiment of the present disclosure may include a buffer check unit 10, a caching policy unit 20, a Time-To-Live (TTL) setting unit 30, a data caching unit 40 and a data deletion unit 50.

The buffer check unit 10 may check a remaining buffer amount $b_{rem}^N$ and a buffer usage amount $b_{use}^N$ of node.

The buffer check unit 10 may compare the remaining buffer amount $b_{rem}^N$ of node with a preset remaining buffer amount threshold $b_{rem}^{thr}$. When data is received from another node, the buffer check unit 10 may check the remaining buffer amount $b_{rem}^N$ of node, and compare the remaining buffer amount $b_{rem}^N$ of node with the remaining buffer amount threshold $b_{rem}^{thr}$. When the remaining buffer amount $b_{rem}^N$ of node is greater than the remaining buffer amount threshold $b_{rem}^{thr}$, the buffer check unit 10 may control to cache the data received from another node in the node.

The buffer check unit 10 may compare the buffer usage amount $b_{use}^N$ of the node with a preset buffer usage amount threshold $b_{use}^{thr}$. When the buffer usage amount $b_{use}^N$ of node is less than the buffer usage amount threshold $b_{use}^{thr}$, the buffer check unit 10 may control to delete the data cached in the node.

As described above, the buffer check unit 10 may check the remaining buffer amount $b_{rem}^N$ and the buffer usage amount $b_{use}^N$ of the node to support data caching or deletion control in the caching policy unit 20 as described below, thereby allowing for efficient management of node buffer capacity.

The caching policy unit 20 may control to cache the data received from another node according to the data caching policy. Additionally, the caching policy unit 20 may control to delete the data cached in the node according to the data deletion policy.

Specifically, the caching policy unit 20 may control to cache the data in the node received from another node according to the data caching policy using data information or node information. When data is received from another node and the buffer check unit 10 identifies that the remaining buffer amount $b_{rem}^N$ of the node is greater than the remaining buffer amount threshold $b_{rem}^{thr}$, the caching policy unit 20 may control to cache the data received from other node according to the data caching policy.

In the following description, the data information may include the number of requester nodes $N_{di}$, TTL $T_{di}$, delivery frequency $f_{di}$, the remaining delivery frequency $F_{di}$ and priority $Y_{di}$ of data.

Additionally, the node information may include delivery predictability $P_{di}$ of data from the node to requester node. The delivery predictability $P_{di}$ may be set as a maximum value $P_{di}^{max}$ or a minimum value $P_{di}^{min}$ of delivery predictability of data from the node to at least one requester node. Alternatively, the delivery predictability $P_{di}$ may be set as a difference $P_{di}^{max}-P_{di}^{min}$, a sum $P_{di}^{sum}$ or an average $P_{di}^{avg}$ of the maximum value $P_{di}^{max}$ and the minimum value $P_{di}^{min}$ of delivery predictability of data from the node to at least one requester node.

According to the data caching policy, the caching policy unit 20 may compare a value $I_{di}$ obtained from the data information or node information with a preset data caching threshold $I_C$.

For example, the caching policy unit 20 may compare the number of requester nodes $N_{di}$ of data received from other node with a preset requester node number threshold $N_C$. Alternatively, the caching policy unit 20 may compare the delivery predictability $P_{di}$ of data received from other node to requester node with a preset delivery predictability threshold $P_C$.

Additionally, the caching policy unit 20 may set the remaining delivery frequency $F_{di}$ of data received from other node according to the results of comparison between the value $I_{di}$ obtained from data information or node information and the data caching threshold $I_C$, and control to cache in the node.

When the value $I_{di}$ obtained from data information or node information is less than the data caching threshold $I_C$, the caching policy unit 20 may set the remaining delivery frequency $F_{di}$ of data received from other node to one (1) and control to cache in the node. In this case, the data received from another node may be only cached in the node until it is delivered to another node.

For example, when the number of requester nodes $N_{di}$ of data received from another node is less than the preset requester node number threshold $N_C$, or the delivery predictability $P_{di}$ of data received from another node to requester node is less than the preset delivery predictability threshold $P_C$, the caching policy unit 20 may set the remaining delivery frequency $F_{di}$ of data received from another node to one (1).

When the value $I_{di}$ obtained from data information or node information is equal to or greater than the data caching threshold $I_C$, the caching policy unit 20 may calculate the remaining delivery frequency $F_{di}$ of data received from another node using the data information or node information as shown in the following Equation 1, and control to cache in the node:

$$F_{d_i} = c_F \times I_{d_i} \quad \text{[Equation 1]}$$

In Equation 1, $F_{di}$ denotes the remaining delivery frequency of data, $c_F$ denotes the delivery frequency coefficient, and $I_{di}$ denotes the value obtained from data information or node information.

For example, when the number of requester nodes $N_{di}$ of data received from other node is equal to or greater than the preset requester node number threshold $N_C$, the caching policy unit 20 may calculate the remaining delivery frequency $F_{di}$ by multiplication of the delivery frequency coefficient $c_F^N$ of the number of requester nodes and the number of requester nodes $N_{di}$ of the data as shown in Equation 1.

Alternatively, when the number of requester nodes $N_{di}$ of data received from another node is equal to or greater than the preset requester node number threshold $N_C$, the caching policy unit 20 may calculate the remaining delivery frequency $F_{di}$ by multiplication of the delivery frequency coefficient $c_F^Y$ of priority and the priority $Y_{di}$ of the data as shown in Equation 1. The priority $Y_{di}$ of data may be expressed as a natural number of $[1, Y]$ according to the grade.

Alternatively, when the delivery predictability $P_{di}$ of data received from another node to requester node is equal to or greater than the preset delivery predictability threshold $P_C$, the caching policy unit 20 may calculate the remaining delivery frequency $F_{di}$ by multiplication of the delivery frequency coefficient $c_F^P$ of delivery predictability and the delivery predictability $P_{di}$ as shown in Equation 1.

Additionally, the caching policy unit 20 may check the remaining delivery frequency $F_{di}$ of data cached in the node, and when the remaining delivery frequency $F_{di}$ of data cached in the node is zero (0), may control to delete the corresponding data from the node.

The caching policy unit 20 may control to delete the data cached in the node according to the data deletion policy using data information or node information. When the buffer check unit 10 identifies that the buffer usage amount $b_{use}^N$ of the node is less than the buffer usage amount threshold $b_{use}^{thr}$, the caching policy unit 20 may control to delete the data cached in the node from the node according to the data deletion policy.

According to the data deletion policy, the caching policy unit 20 may arrange at least one data cached in the node based on data information or node information of each of the at least one data cached in the node.

For example, the caching policy unit 20 may arrange at least one data cached in the node in ascending order of the number of requester nodes of data.

Alternatively, the caching policy unit 20 may arrange at least one data cached in the node in ascending order of the TTL of data.

Alternatively, the caching policy unit 20 may arrange at least one data cached in the node in descending order of the delivery frequency of data.

Alternatively, the caching policy unit 20 may arrange at least one data cached in the node in ascending order of the priority of data.

Alternatively, the caching policy unit 20 may arrange at least one data cached in the node in ascending order of the delivery predictability to requester node.

Alternatively, the caching policy unit 20 may calculate a data information arrangement value $I_{di}^{pl}$ using data information or node information of each of at least one data cached in the node and arrange the at least one data cached in the node based on the data information arrangement value $I_{di}^{pl}$. Here, the data information arrangement value $I_{di}^{pl}$ may be a value denoting the relationship between multiple data information. Alternatively, the data information arrangement value $I_{di}^{pl}$ may be a value denoting the relationship between the node information and the priority of data.

For example, the caching policy unit 20 may calculate a delivery frequency ratio $W_{di}^f$ or the data information arrangement value $I_{di}^{pl}$ that is calculated as a ratio of the number of requester nodes $N_{di}$ and the delivery frequency $f_{di}$ of data as shown in the following Equation 2, and arrange at least one data cached in the node in descending order of the delivery frequency ratio $W_{di}^f$:

$$W_{d_i}^f = \frac{f_{d_i}}{N_{d_i}} \quad \text{[Equation 2]}$$

In Equation 2, $W_{di}^f$ denotes the delivery frequency ratio, $f_{di}$ denotes the delivery frequency of data, and $N_{di}$ denotes the number of requester nodes of data.

Alternatively, the caching policy unit 20 may calculate a priority multiple $W_{di}^Y$ or the data information arrangement value $I_{di}^{pl}$ that is calculated by multiplication of the number of requester nodes $N_{di}$ and the priority $Y_{di}$ of data as shown in the following Equation 3, and arrange at least one data cached in the node in ascending order of the priority multiple $W_{di}^Y$:

$$W_{d_i}^Y = N_{d_i} = Y_{d_i} \quad \text{[Equation 3]}$$

In Equation 3, $W_{di}^Y$ denotes the priority multiple, $N_{di}$ denotes the number of requester nodes of data, and $Y_{di}$ denotes the priority of data.

Alternatively, the caching policy unit 20 may calculate a delivery predictability multiple $P_{di}^{pl}$ or the data information arrangement value $I_{di}^{pl}$ that is calculated by multiplication of the delivery predictability $P_{di}$ to data requester node and the priority $Y_{di}$ as shown in the following Equation 4, and arrange at least one data cached in the node in ascending order of the delivery predictability multiple $P_{di}^{pl}$:

$$P_{d_i}^{pl} = P_{d_i} = Y_{d_i} \quad \text{[Equation 4]}$$

In Equation 4, $P_{d_i}^{pl}$ denotes the delivery predictability multiple, $P_{di}$ denotes the delivery predictability of data to requester node, and $Y_{di}$ denotes the priority of data.

As described above, the caching policy unit 20 may arrange at least one data cached in the node, and delete the data cached in the node in the order of arrangement.

The TTL setting unit 30 may set an initial TTL value of data received from other node and control to cache in the node. Additionally, the TTL setting unit 30 may update the TTL of data cached in the node.

Specifically, the TTL setting unit 30 may set the initial TTL value of data received from another node using data information or node information. When the caching policy of data received from another node is determined by the caching policy unit 20, the TTL setting unit 30 may set the initial TTL value of the corresponding data.

The TTL setting unit 30 may set the initial TTL value $T_{di}^{init}$ of data received from another node as the sum of the value $I_{di}$ obtained from data information or node information multiplied by the TTL coefficient $c_T$ and the TTL constant $C_T$ as shown in the following Equation 5 and control to cache in the node. Here, the TTL coefficient $c_T$ may be set as a difference $T_{di}^{max} - T_{di}^{min}$ of the maximum TTL value $T_{di}^{max}$ and the minimum TTL value $T_{di}^{min}$, and the TTL constant $C_T$ may be set as the minimum TTL value $T_{di}^{min}$.

$$T_{d_i}^{init} = c_T \times I_{d_i} + C_T \quad \text{[Equation 5]}$$

In Equation 5, $T_{d_i}^{init}$ denotes the initial TTL value, $c_T$ denotes the TTL coefficient, $I_{di}$ denotes the value obtained from data information or node information, and $C_T$ denotes the TTL constant.

For example, the TTL setting unit 30 may set the initial TTL value $T_{di}^{init}$ of data received from another node by applying the number of requester nodes $N_{di}$ of data received from another node to the value $I_{di}$ obtained from data information or node information Equation 5.

Alternatively, the TTL setting unit 30 may set the initial TTL value $T_{di\ i}^{init}$ of data received from another node by applying the priority $Y_{di}$ of data received from another node to the value $I_{di}$ obtained from data information or node information in Equation 5.

Alternatively, the TTL setting unit 30 may set the initial TTL, value $T_{di}^{init}$ of data received from another node by applying the delivery predictability $P_{di}$ of data received from another node to requester node to the value $I_{di}$ obtained from data information or node information in Equation 5.

When a unit time τ has elapsed, the TTL setting unit 30 may update the TTL of data cached in the node using data information or node information.

The TTL setting unit 30 may calculate a variation $I_{di}^\tau$ of the value obtained from data information or node information for the unit time τ. The TTL setting unit 30 may calculate a TTL increase and decrease the value $\Delta T_{di}$ of data cached in the node by multiplication of the variation $I_{di}^\tau$ of the value obtained from data information or node information for the unit time τ and the TTL increase/decrease coefficient $c_{\Delta T}$ as shown in the following Equation 6:

$$\Delta T_{d_i} = c_{\Delta T} \times I_{d_i}^\tau \quad \text{[Equation 6]}$$

In Equation 6, $\Delta T_{di}$ denotes the TTL increase and decrease value, $c_{\Delta T}$ denotes the TTL increase and decrease coefficient, and $I_{di}^\tau$ denotes the variation of the value obtained from data information or node information per the unit time τ.

For example, the TTL setting unit 30 may calculate a requester node number variation $N_{di}^{\%}$ of data cached in the node per the unit time τ, and calculate a TTL increase and decrease value $\Delta T_{di}$ of data cached in the node by applying the requester node number variation $N_{di}^\tau$ to the variation $I_{di}^\tau$ of the value obtained from data information or node information per the unit time τ in Equation 6.

Alternatively, the TTL setting unit 30 may calculate a remaining delivery frequency variation $F_{di}^\tau$ of data cached in the node per the unit time τ, and calculate a TTL increase and decrease value $\Delta T_{di}$ of data cached in the node by applying the remaining delivery frequency variation $F_{di}^\tau$ to the variation $I_{di}^\tau$ of the value obtained from data information or node information per the unit time τ in Equation 6.

Alternatively, the TTL setting unit 30 may calculate a delivery predictability variation $P_{di}^\tau$ of data cached in the node to requester node for the unit time τ, and calculate a TTL increase and decrease the value $\Delta T_{di}$ of data cached in the node by applying the delivery predictability variation $P_{di}^\tau$ to the variation $I_{di}^\tau$ of the value obtained from data information or node information per the unit time τ in Equation 6.

The TTL setting unit 30 may update the TTL of data cached in the node by adding the TTL increase and decrease value $\Delta T_{di}$ to the current TTL $T_{di}^{old}$ of data cached in the node as shown in the following Equation 7:

$$T_{d_i}^{new} = T_{d_i}^{old} + \Delta T_{d_i} \quad \text{[Equation 7]}$$

In Equation 7, $T_{di}^{new}$ denotes the updated TTL of data cached in the node, $T_{di}^{old}$ denotes the current TTL of data cached in the node, and $\Delta T_{di}$ denotes the TTL increase and decrease value.

Meanwhile, the TTL setting unit 30 may check the TTL $T_{di}$ of data cached in the node, and when the TTL $T_{di}$ of data cached in the node is equal to or less than zero (0), may control to delete the data cached in the node from the node.

The data caching unit 40 caches data, for which the caching policy is determined the by caching policy unit 20 in the buffer of the node.

The data deletion unit 50 may delete data, for which the deletion policy is determined by the caching policy unit 20 from the buffer of the node.

As described above, the data caching device 1000 according to the embodiment of the present disclosure may control the data caching or deletion according to the data caching or deletion policy using data information or node information defined in ICN in consideration of node buffer capacity. Accordingly, it is possible to allow for efficient node buffer capacity management in DTN having limited node buffer capacity, and caching policy in consideration of the presence of multiple requester nodes for the same data in DTN environment.

Hereinafter, a method of data caching in delay tolerant network based on information centric network according to the embodiment of the present disclosure will be described.

The data caching method according to the embodiment of the present disclosure may be applied to each node in a network environment to control caching of data received from another node or deletion of data cached in node.

The data caching method according to the embodiment of the present disclosure may be performed in substantially the same configuration as the data caching device 1000 of FIG. 1. Accordingly, the same drawing signs are given to the same elements as the data caching device 1000 of FIG. 1, and repeated descriptions are omitted herein.

Figure 2:
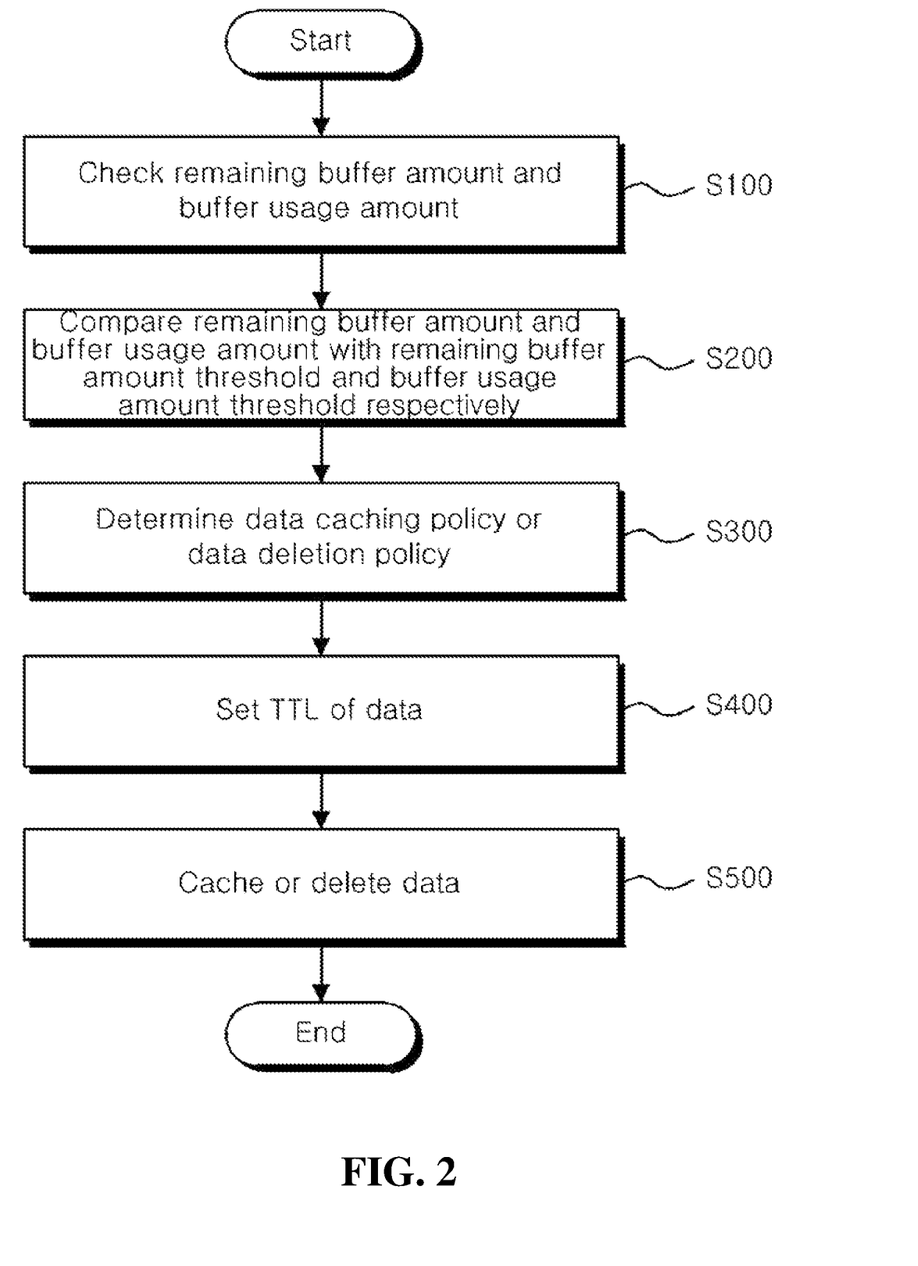
FIG. 2 is a flowchart of a congestion control method according to the embodiment of the present disclosure.

FIG. 2 is a flowchart of a congestion control method according to the embodiment of the present disclosure.

Referring to FIG. 2, the buffer check unit 10 may check a remaining buffer amount and a buffer usage amount of node (S100).

The buffer check unit 10 may compare the remaining buffer amount and the buffer usage amount with a preset remaining buffer amount threshold and a preset buffer usage amount threshold respectively (S200).

According to the results of comparison between the remaining buffer amount and the buffer usage amount and each threshold, the caching policy unit 20 may determine the caching policy of data received from another node or the deletion policy of data cached in node (S300). Its detailed description will be provided below with reference to FIGS. 3 and 4.

The TTL setting unit 30 may set the TTL of data received from another node or data cached in node (S400). Its detailed description will be provided below with reference to FIG. 5.

The data caching unit 40 may cache data received from another node in node according to the data caching policy, and the data deletion unit 50 may delete data cached in node according to the data deletion policy (S500).

Figure 3:
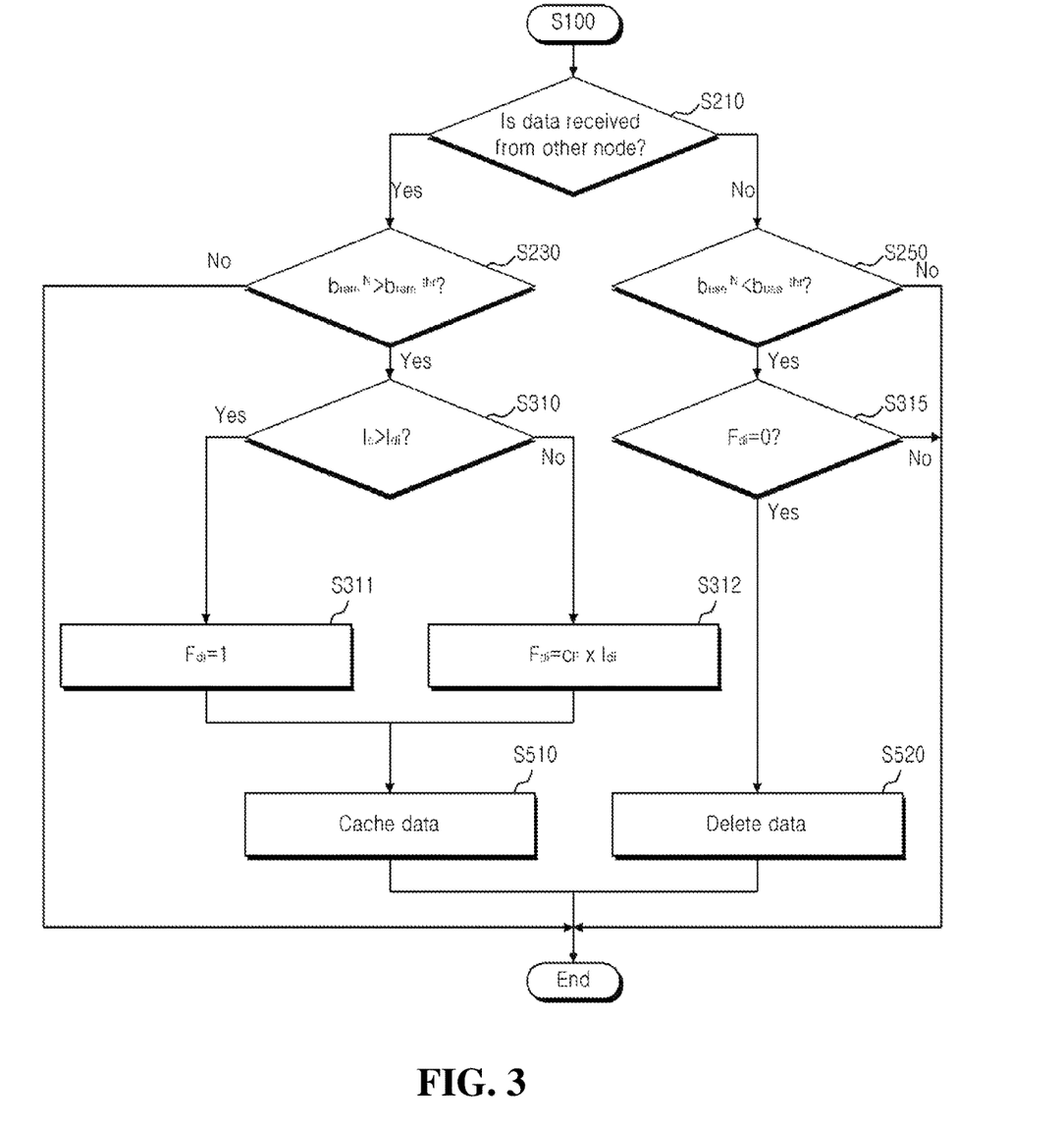
FIG. 3 is a detailed flowchart when determining a data caching policy in the step of determining a data caching policy or a data deletion policy shown in FIG. 2.

FIG. 3 is a detailed flowchart when determining a data caching policy in the step of determining a data caching policy or a data deletion policy shown in FIG. 2.

Referring to FIG. 3, when data is received from another node (S210), and the remaining buffer amount $b_{rem}^{N}$ of the node is greater than the remaining buffer amount threshold $b_{rem}^{thr}$ (S230), the caching policy unit 20 may compare the value $I_{di}$ obtained from data information or node information with the preset data caching threshold $I_C$ (S310).

For example, the caching policy unit 20 may compare the number of requester nodes $N_{di}$ of data received from another node with the preset requester node number threshold $N_C$. Alternatively, the caching policy unit 20 may compare the delivery predictability $P_{di}$ of data received from another node to requester node with the preset delivery predictability threshold $P_C$.

When the value $I_{di}$ obtained from data information or node information is less than preset data caching threshold $I_C$ (S310), the caching policy unit 20 may set the remaining delivery frequency $F_{di}$ of data, received from another node to one (1) (S311), and control to cache in the node (S510).

For example, when the number of requester nodes $N_{di}$ of data received from another node is less than the preset requester node number threshold $N_C$, or the delivery predictability $P_{di}$ of data received from another node to requester node is less than the preset delivery predictability threshold $P_C$, the caching policy unit 20 may set the remaining delivery frequency $F_{di}$ of data received from another node to one (1).

When the value $I_{di}$ obtained from data information or node information is equal to or greater than the preset data caching threshold $I_C$ (S310), the caching policy unit 20 may calculate the remaining delivery frequency $F_{di}$ by multiplication of the value $I_{di}$ obtained from data information or node information and the delivery frequency coefficient $c_F$ as shown in the above Equation 1 (S312), and control to cache in the node (S510).

For example, when the number of requester nodes $N_{di}$ of data received from another node is equal to or greater than the preset requester node number threshold $N_C$, the caching policy unit 20 may calculate the remaining delivery frequency $F_{di}$ by multiplication of the delivery frequency coefficient $c_F^N$ of the number of requester nodes and the number of requester nodes $N_{di}$ of the data as shown in Equation 1.

Alternatively, when the number of requester nodes $N_{di}$ of data received from another node is equal to or greater than the preset requester node number threshold $N_C$, the caching policy unit 20 may calculate the remaining delivery frequency $F_{di}$ by multiplication of the delivery frequency coefficient $c_F^Y$ of priority and the priority $Y_{di}$ of data as shown in Equation 1. The priority $Y_{di}$ of data may be represented as a natural number of [1, Y] according to the grade.

Alternatively, when the delivery predictability $P_{di}$ of data received from another node to requester node is equal to or more than the preset delivery predictability threshold $P_C$, the caching policy unit 20 may calculate the remaining delivery frequency $F_{di}$ by multiplication of the delivery frequency coefficient $c_F^P$ of delivery predictability and the delivery predictability $P_{di}$ as shown in Equation 1.

Meanwhile, when data is not received from another node (S210) and the buffer usage amount buseN of node is less than the buffer usage amount threshold busethr (S250), the caching policy unit 20 may check the remaining delivery frequency Fdi of data cached in the node (S315).

When the remaining delivery frequency $F_{di}$ of data cached in the node is zero (0) (S315), the caching policy unit 20 may control to delete the corresponding data from the buffer of the node (S520).

Figure 4:
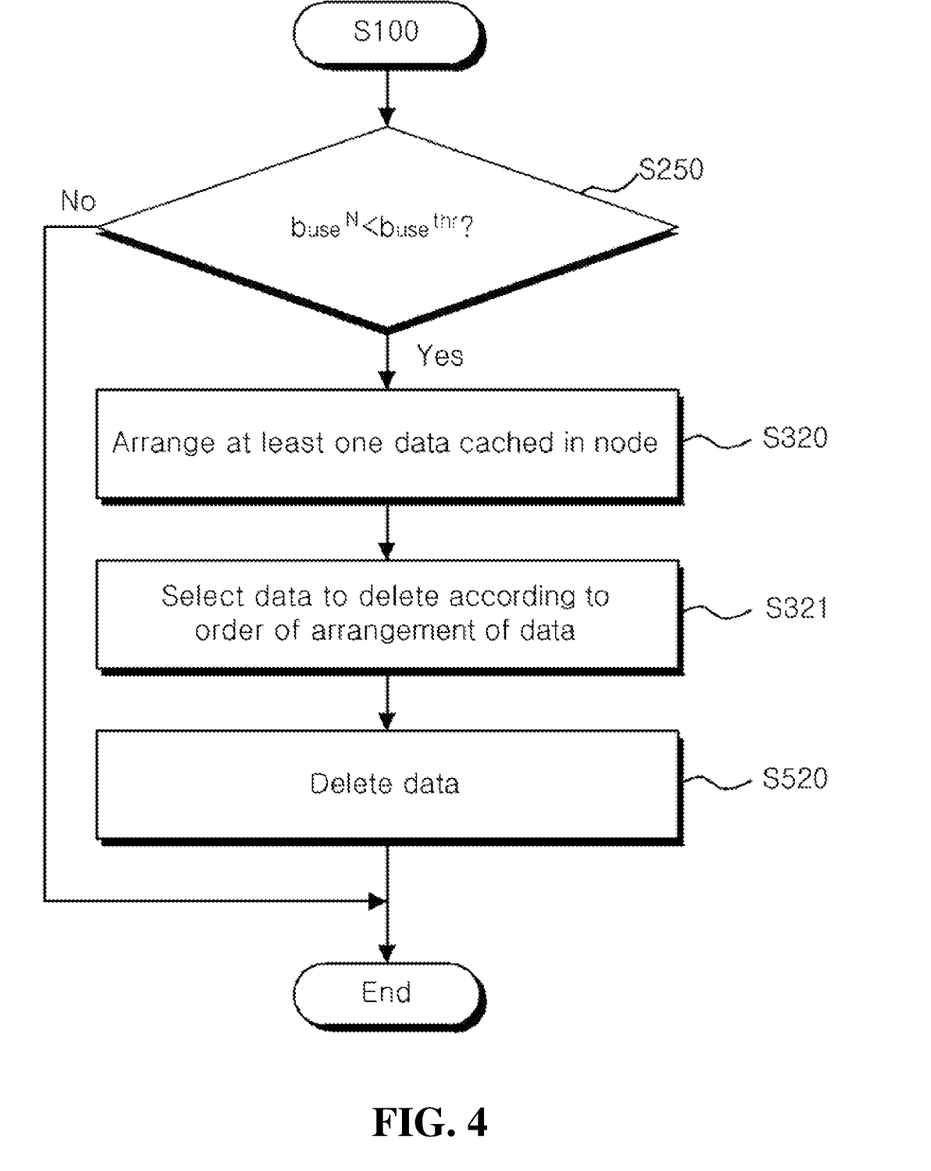
FIG. 4 is a detailed flowchart when determining a data deletion policy in the step of determining a data caching policy or a data deletion policy shown in FIG. 2.

FIG. 4 is a detailed flowchart when determining a data deletion policy in the step of determining a data caching policy or a data deletion policy shown in FIG. 2.

Referring to FIG. 4, when the buffer usage amount $b_{use}^{N}$ of node is less than the buffer usage amount threshold $b_{use}^{thr}$ (S250), the caching policy unit 20 may arrange at least one data cached in the node (S320).

For example, the caching policy unit 20 may arrange at least one data cached in the node in ascending order of the number of requester nodes of data.

Alternatively, the caching policy unit 20 may arrange at least one data cached in the node in ascending order of the TTL of data.

Alternatively, the caching policy unit 20 may arrange at least one data cached in the node in descending order of the delivery frequency of data.

Alternatively, the caching policy unit 20 may arrange at least one data cached in the node in ascending order of the priority of data.

Alternatively, the caching policy unit 20 may arrange at least one data cached in the node in ascending order of the delivery predictability to requester node.

Alternatively, the caching policy unit 20 may calculate the data information arrangement value $I_{di}^{pl}$ using data information or node information of each of at least one data cached in the node, and arrange at least one data cached in the node based on the data information arrangement value $I_{di}^{pl}$. Here, the data information arrangement value $I_{di}^{pl}$ may be a value denoting the relationship between multiple data information. Alternatively, the data information arrangement value $I_{di}^{pl}$ may be a value denoting the relationship between the node information and the priority of data.

For example, the caching policy unit 20 may calculate the delivery frequency ratio $W_{di}^{f}$ or the data information arrangement value $I_{di}^{pl}$ that is calculated as a ratio of the number of requester nodes $N_{di}$ and the delivery frequency $f_{di}$ of data as shown in Equation 2, and arrange at least one data cached in the node in descending order of the delivery frequency ratio $W_{di}^{f}$.

Alternatively, the caching policy unit 20 may calculate the priority multiple $W_{di}^{Y}$ or the data information arrangement value $I_{di}^{pl}$ that is calculated by multiplication of the number of requester nodes $N_{di}$ and the priority $Y_{di}$ of data as shown in the above Equation 3, and arrange at least one data cached in the node in ascending order of the priority multiple $W_{di}^{Y}$.

Alternatively, the caching policy unit 20 may calculate the delivery predictability multiple $P_{di}^{pl}$ or the data information arrangement value $I_{di}^{pl}$ that is calculated by multiplication of the delivery predictability $P_{di}$ to data requester node and the priority $Y_{di}$ as shown in the above Equation 4, and arrange at least one data cached in the node in ascending order of the delivery predictability multiple $P_{di}^{pl}$.

The caching policy unit 20 may select data to delete from at least e data cached in the node according to the order of arrangement of the at least one data cached in the node (S321).

The caching policy unit 20 may control to delete the selected data from the buffer of the node (S520).

Figure 5:
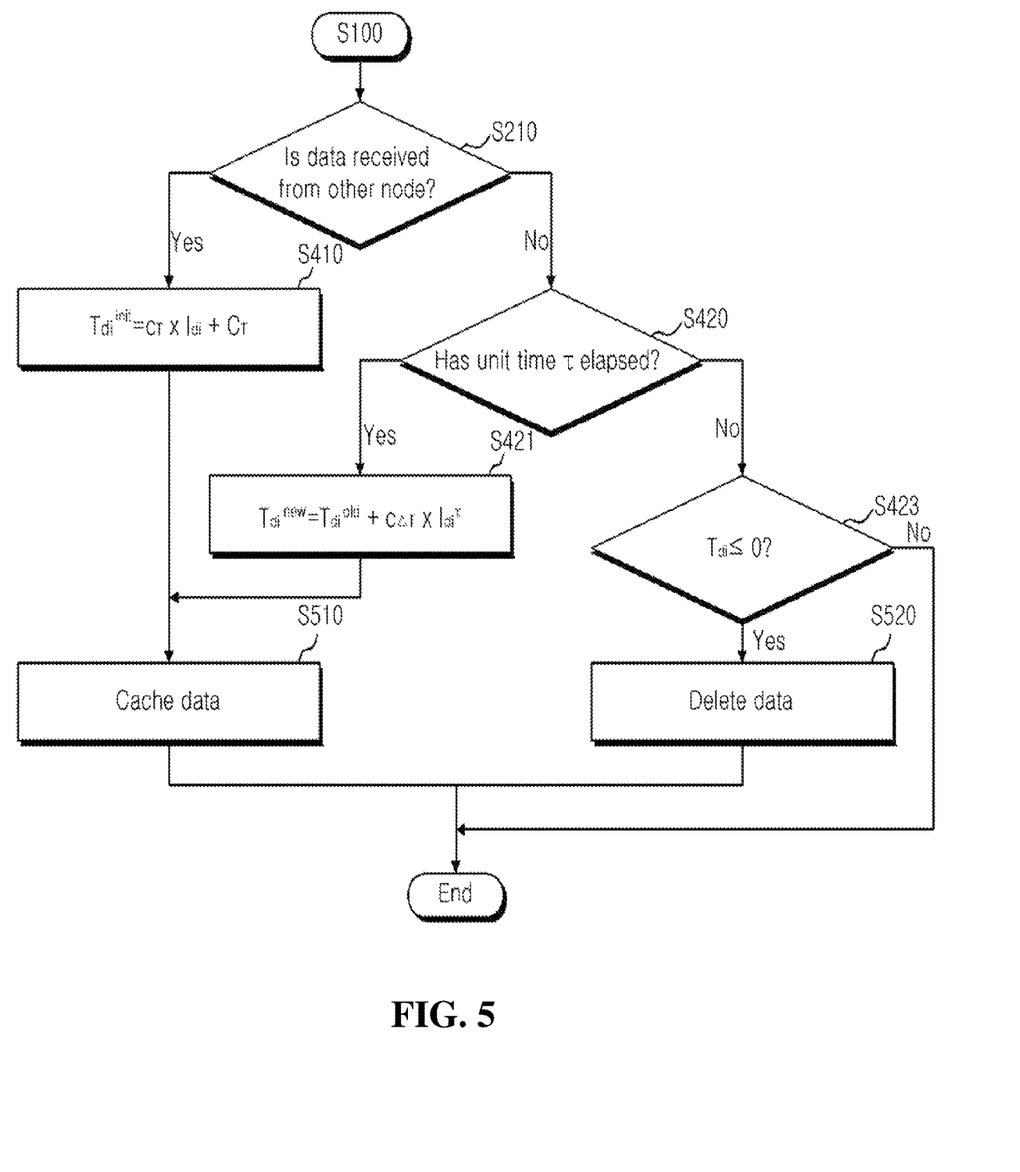
FIG. 5 is a detailed flowchart of the step of setting a Time-To-Live, of data shown in FIG. 2.

FIG. 5 is a detailed flowchart of the step of setting the TTL of data shown in FIG. 2.

Referring to FIG. 5, when data is received from another node (S210), the TTL setting unit 30 may set the initial TTL, value $T_{di}^{init}$ of the data received from another node as the sum of the value $I_{di}$ obtained from data information or node information of the data received from another node multiplied by the TTL coefficient $c_T$ and the TTL constant $C_T$ as shown in the above Equation 5 (S410), and control to cache in the node (S510).

For example, the TTL setting unit 30 may set the initial TTL value $T_{di}^{init}$ of the data received from another node by applying the number of requester nodes $N_{di}$ of the data received from other node to the value $I_{di}$ obtained from data information or node information in Equation 5.

Alternatively, the TTL setting unit 30 may set the initial TTL value $T_{di}^{init}$ of the data received from another node by applying the priority $Y_{di}$ of the data received from another node to the value $I_{di}$ obtained from data information or node information in Equation 5.

Alternatively, the TTL setting unit 30 may set the initial TTL value $T_{di}^{init}$ of the data received from another node by applying the delivery predictability $P_{di}$ of data received from another node to requester node to the value $I_{di}$ obtained from data information or node information in Equation 5.

Meanwhile, when data is not received from another node (S210), the TTL setting unit 30 may check if the unit time τ has elapsed (S420).

When the unit time τ has elapsed (S420), the TTL setting unit 30 may update the TTL $T_{di}^{new}$ of data cached in the node by adding a value obtained by multiplying the variation $I_{di}^{\tau}$ the value obtained from data information or node information per the unit time τ by the TTL increase and decrease coefficient $c_{\Delta T}$ to the current TTL $T_{di}^{old}$ of the data cached in the node as shown in the following Equation 8 (S421), and control to cache in the node (S510).

$$T_{d_i}^{new} = T_{d_i}^{old} + c_{\Delta T} \times I_{d_i}^{\tau} \quad \text{[Equation 8]}$$

In Equation 8, $T_{di}^{new}$ denotes the updated TTL of data cached in the node, $T_{di}^{old}$ denotes the current TTL of data cached in the node, $c_{\Delta T}$ denotes the TTL increase and decrease coefficient, and $I_{di}^{\tau}$ denotes the variation of the value obtained from data information or node information per the unit time τ.

For example, the TTL setting unit 30 may calculate the requester node number variation $N_{di}^{\tau}$ of data cached in the node per the unit time τ, and calculate the TTL increase and decrease value $\Delta T_{di}$ of data cached in the node by applying the requester node number variation $N_{di}^{\tau}$ to the variation $I_{di}^{\tau}$ of the value obtained from data information or node information per the unit time τ in the above Equation 6.

Alternatively, the TTL setting unit 30 may calculate the remaining delivery frequency variation $F_{di}^{\tau}$ of data cached in the node per the unit time τ, and calculate the TTL increase and decrease the value $\Delta T_{di}$ of data cached in the node by applying the remaining delivery frequency variation $F_{di}^{\tau}$ to the variation $I_{di}^{\tau}$ of the value obtained from data information or node information per the unit time τ in the above Equation 6.

Alternatively, the TTL setting unit 30 may calculate the delivery predictability variation $P_{di}^{\tau}$ of data cached in the node to requester node per the unit time τ, and calculate the TTL increase and decrease the value $\Delta T_{di}$ of the data cached in the node by applying the delivery predictability variation $P_{di}^{\tau}$ to the variation $I_{di}^{\tau}$ of the value obtained from data information or node information per the unit time τ in the above Equation 6.

Additionally, the TTL setting unit 30 may update the TTL of data cached in the node by adding the TTL increase and decrease the value $\Delta T_{di}$ to the current TTL $T_{di}^{old}$ of data cached in the node.

Meanwhile, when the unit time τ has not elapsed (S420), the TTL setting unit 30 may check the TTL $T_{di}$ of data cached in the node (S423).

When the TTL $T_{di}$ of data cached in the node is equal to or less than zero (0) (S423), the TTL setting unit 30 may control to delete the data cached in the node from the node (S520).

Accordingly, the data caching method according to the embodiment of the present disclosure can control data caching or deletion according to a data caching or deletion policy using data information or node information defined in an ICN in consideration of node buffer capacity. Accordingly, it is possible to allow for efficient node buffer capacity management in a DTN having limited node buffer capacity, and provide a caching service in consideration of the presence of multiple requester nodes for the same data in a DTN environment.

The above-described method of data caching in DTN based on ICN may be implemented as an application or in the form of program commands that are executed through various computer components, and recorded in computer-readable recording media. The computer-readable recording media may include program commands, data files and data structures, alone or in combination.

The program commands in recorded in the computer-readable recording media may be specially designed and configured for the present disclosure and may be known and available to those having ordinary skill in the field of computer software.

Examples of the computer-readable recording media include hardware devices specially designed to store and execute program commands, such as magnetic media such as hard disk, floppy disk and magnetic tape, optical recording media such as CD-ROM and DVD, magneto-optical media such as floptical disk, and ROM, RAM and flash memory.

Examples of the program commands include machine codes generated by a compiler as well as high-level language codes that can he executed by a computer using an interpreter. The hardware device may be configured to act as one or more software modules to perform processing according to the present disclosure, or vice versa.

While the present disclosure has been hereinabove described with reference to the embodiments, it will be apparent to those skilled in the corresponding technical field that a variety of modifications and changes may be made thereto without departing from the spirit and scope of the present disclosure set forth in the appended claims.

DETAILED DESCRIPTION OF MAIN ELEMENTS

1000: Data caching device
10: Buffer check unit
20: Caching policy unit
30: TTL setting unit
40: Data caching unit
50: Data deletion unit

What is claimed is:

1. A method of data caching in a delay tolerant network based on an information centric network, the method comprising:
   checking whether data is received from a first node;
   checking a remaining buffer amount and a buffer usage amount of a second node;
   caching the data received from the first node in the second node according to a data caching policy, when the data is received from the first node and the remaining buffer amount of the second node is greater than a preset remaining buffer amount threshold;
   deleting data cached in the second node from the second node according to a data deletion policy, when the data is not received from the first node and the buffer usage amount of the second node is less than a preset buffer usage amount threshold; and
   setting an initial Time-to-Live (TTL) value of the data received from the first node or updating a TTL of the data cached in the second node using information of the data received from the first node or information of the second node,
   wherein the caching of the data comprises:
   comparing data information including the number of requester nodes of the data received from the first node or node information including delivery predictability of the data received from the first node to a requester node with a preset data caching threshold; and
   setting a remaining delivery frequency of the data received from the first node according to a result of the comparison between the data information or the node information and the preset data caching threshold, and caching the data received from the first node in the second node.

2. The method of claim 1, wherein the setting of the initial TTL value comprises:
   setting the initial TTL value of the data received from the first node using the data information including the number of requester nodes and a priority of the data received from the first node, or the node information including the delivery predictability of the data received from the first node to the requester node.

3. The method of claim 1, wherein the updating of the TTL comprises:
   calculating a variation of the data information including the number of requester nodes and a remaining delivery frequency of the data cached in the second node or delivery predictability of the data cached in the second node to the requester node for a unit time;
   calculating a TTL increase and decrease value of the data cached in the second node using the variation per the unit time; and
   updating the TTL of the data cached in the second node by adding the TTL increase and decrease value to a current TTL of the data cached in the second node.

4. The method of claim 1, wherein the updating of the TTL comprises:
   checking the TTL of the data cached in the second node; and
   when the TTL of the data cached in the second node is equal to or less than zero (0), deleting the data cached in the second node from the second node.

5. The method of claim 1, wherein the deleting of the data comprises:
   arranging at least one sub-data in the data cached in the second node based on delivery predictability of the data cached in the second node to the requester node, or calculating a node information arrangement value representing a relationship between delivery predictability of the data cached in the second node to a requester node and a priority of the data cached in the second node, and arranging at least one sub-data in the data cached in the second node based on the node information arrangement value; and
   deleting the data cached in the second node according to an order of the arrangement of the at least one sub-data in the data cached in the second node.

6. The method of claim 1, wherein the setting of the remaining delivery frequency of the data comprises:
   when the data information or the node information is less than the preset data caching threshold, setting the remaining delivery frequency of the data received from the first node to one (1), and caching the data received from the first node in the second node; and
   when the data information or the node information is equal to or greater than the preset data caching threshold, calculating the remaining delivery frequency of the data received from the first node using the data information or the node information.

7. The method of claim 1, wherein the setting of the remaining delivery frequency of the data comprises:
   checking the remaining delivery frequency of the data cached in the second node; and
   when the remaining delivery frequency of the data cached in the second node is zero (0), deleting the data cached in the second node.

8. The method of claim 1, wherein the deleting of the data comprises:
   arranging at least one sub-data in the data cached in the second node based on the data information including the number of requester nodes, the TTL, a remaining delivery frequency and a priority of the data cached in the second node; and
   deleting the data cached in the second node according to an order of the arrangement of the at least one sub-data in the data cached in the second node.

9. The method of claim 1, wherein the deleting of the data comprises:
   calculating a data information arrangement value representing a relationship between the data information including the number of requester nodes, the TTL, a remaining delivery frequency and a priority of the data cached in the second node;
   arranging at least one sub-data in the data cached in the second node based on the data information arrangement value; and
   deleting the data cached in the second node according to an order of the arrangement of the at least one sub-data in the data cached in the second node.

10. A device for data caching in a delay tolerant network based on an information centric network, the device comprising:

a memory; and one or more processors configured to:

check whether data is received from a first node;

check a remaining buffer amount and a buffer usage amount of a second node;

cache the data received from the first node in the second node according to a data caching policy, when the data is received from the first node and the remaining buffer amount of the second node is greater than a preset remaining buffer amount threshold;

delete data cached in the second node from the second node according to a data deletion policy, when the data is not received from the first node and the buffer usage amount of the second node is less than a preset buffer usage amount threshold; and set an initial Time-to-Live (TTL) value of the data received from the first node or updating a TTL of the data cached in the second node using information of the data received from the first node or information of the second node, wherein the caching of the data comprises:

comparing data information including the number of requester nodes of the data received from the first node or node information including delivery predictability of the data received from the first node to a requester node with a preset data caching threshold; and setting a remaining delivery frequency of the data received from the first node according to a result of the comparison between the data information or the node information and the preset data caching threshold, and caching the data received from the first node in the second node.

11. A computer-readable non-transitory recording medium having recorded thereon a computer program for performing a method of data caching, the method comprising:

checking whether data is received from a first node;

checking a remaining buffer amount and a buffer usage amount of a second node;

caching the data received from the first node in the second node according to a data caching policy, when the data is received from the first node and the remaining buffer amount of the second node is greater than a preset remaining buffer amount threshold;

deleting data cached in the second node from the second node according to a data deletion policy, when the data is not received from the first node and the buffer usage amount of the second node is less than a preset buffer usage amount threshold; and setting an initial Time-to-Live (TTL) value of the data received from the first node or updating a TTL of the data cached in the second node using information of the data received from the first node or information of the second node, wherein the caching of the data comprises:

comparing data information including the number of requester nodes of the data received from the first node or node information including delivery predictability of the data received from the first node to a requester node with a preset data caching threshold; and setting a remaining delivery frequency of the data received from the first node according to a result of the comparison between the data information or the node information and the preset data caching threshold, and caching the data received from the first node in the second node.

\* \* \* \* \*